(12) United States Patent
Maeno

(10) Patent No.: US 9,795,994 B2
(45) Date of Patent: Oct. 24, 2017

(54) CARBON NANOTUBE ASSEMBLY AND VISCOELASTIC BODY USING SAME

(71) Applicant: NITTO DENKO CORPORATION, Osaka (JP)

(72) Inventor: Youhei Maeno, Ibaraki (JP)

(73) Assignee: NITTO DENKO CORPORATION, Osaka (JP)

( * ) Notice: Subject to any disclaimer, the term of this patent is extended or adjusted under 35 U.S.C. 154(b) by 587 days.

(21) Appl. No.: 14/359,421

(22) PCT Filed: Oct. 5, 2012

(86) PCT No.: PCT/JP2012/075980
§ 371 (c)(1),
(2) Date: May 20, 2014

(87) PCT Pub. No.: WO2013/084580
PCT Pub. Date: Jun. 13, 2013

(65) Prior Publication Data
US 2014/0322517 A1    Oct. 30, 2014

(30) Foreign Application Priority Data
Dec. 8, 2011    (JP) .................... 2011-268979

(51) Int. Cl.
| B07B 13/04 | (2006.01) |
| C01B 31/02 | (2006.01) |
| B82Y 30/00 | (2011.01) |
| B82Y 40/00 | (2011.01) |

(52) U.S. Cl.
CPC .............. B07B 13/04 (2013.01); B82Y 30/00 (2013.01); B82Y 40/00 (2013.01); C01B 31/0226 (2013.01); C01B 2202/08 (2013.01); C01B 2202/34 (2013.01); Y10S 977/752 (2013.01); Y10S 977/753 (2013.01); Y10S 977/962 (2013.01); Y10T 428/249924 (2015.04); Y10T 428/2918 (2015.01)

(58) Field of Classification Search
CPC .. B07B 13/04; Y10S 977/752; Y10S 977/753; Y10S 977/962; B82Y 30/00
See application file for complete search history.

(56) References Cited

U.S. PATENT DOCUMENTS

| 7,459,013 B2 | 12/2008 | Holmes et al. |
| 7,674,324 B2 | 3/2010 | Holmes et al. |
| 7,708,816 B2 | 5/2010 | Holmes et al. |
| 7,922,796 B2 | 4/2011 | Holmes et al. |
| 8,025,971 B2 | 9/2011 | Maeno et al. |
| 8,227,080 B2 | 7/2012 | Maeno et al. |
| 8,512,458 B2 | 8/2013 | Holmes et al. |
| 8,598,250 B2 | 12/2013 | Hirao et al. |
| 2004/0071870 A1 | 4/2004 | Knowles et al. |
| 2006/0068195 A1 | 3/2006 | Majumdar et al. |
| 2008/0271606 A1 | 11/2008 | Holmes et al. |
| 2008/0282893 A1 | 11/2008 | Holmes et al. |
| 2008/0284992 A1 | 11/2008 | Holmes et al. |
| 2008/0286466 A1 | 11/2008 | Holmes et al. |
| 2009/0186164 A1 | 7/2009 | Hirao et al. |
| 2010/0119422 A1 | 5/2010 | Holmes et al. |
| 2011/0039095 A1 | 2/2011 | Maeno et al. |
| 2011/0133135 A1 | 6/2011 | Maeno et al. |
| 2011/0189459 A1 | 8/2011 | Maeno et al. |
| 2012/0258275 A1* | 10/2012 | Maeno .................. B82Y 30/00 428/95 |

FOREIGN PATENT DOCUMENTS

| CN | 1277147 | 12/2000 |
| CN | 1775342 | 5/2006 |
| EP | 1061043 | 12/2000 |
| JP | 2009-173695 | 8/2009 |
| WO | 2006/115486 | 11/2006 |
| WO | 2009/128342 | 10/2009 |
| WO | 2009/128343 | 10/2009 |
| WO | 2010/032525 | 3/2010 |
| WO | 2011/077784 | 6/2011 |
| WO | 2011/077785 | 6/2011 |

OTHER PUBLICATIONS

International Search Report, mail date is Dec. 25, 2012.
China Office action, dated Apr. 1, 2015 along with an English translation thereof.

* cited by examiner

*Primary Examiner* — Robert Harlan
(74) *Attorney, Agent, or Firm* — Greenblum & Bernstein, P.L.C.

(57) ABSTRACT

A carbon nanotube aggregate according to one embodiment of the present invention includes a plurality of carbon nanotubes, in which: the carbon nanotubes each have a plurality of walls; a distribution width of a wall number distribution of the carbon nanotubes is 10 walls or more; a relative frequency of a mode of the wall number distribution is 25% or less; and a length of each of the carbon nanotubes is more than 10 μm. A carbon nanotube aggregate according to another embodiment of the present invention includes a plurality of carbon nanotubes, in which: the carbon nanotubes each have a plurality of walls; a mode of a wall number distribution of the carbon nanotubes is present at a wall number of 10 or less; a relative frequency of the mode is 30% or more; and a length of each of the carbon nanotubes is more than 10 μm.

8 Claims, 2 Drawing Sheets

CARBON NANOTUBE ASSEMBLY AND VISCOELASTIC BODY USING SAME

TECHNICAL FIELD

The present invention relates to a carbon nanotube aggregate and a viscoelastic body using the carbon nanotube aggregate.

BACKGROUND ART

A viscoelastic body is useful as a material for a pressure-sensitive adhesive, and has been actively researched and developed in various industrial fields, by virtue of its excellent balance between elasticity and viscosity (see Patent Literature 1). Because of its low modulus, a pressure-sensitive adhesive formed of the viscoelastic body becomes wet to conform to an adherend, thereby expressing its pressure-sensitive adhesive strength.

Hitherto, an acrylic resin, a rubber-based resin, a silicone-based resin, or the like has been generally used as the material for a pressure-sensitive adhesive.

Meanwhile, a fibrous columnar structure having a fine diameter has been known to exhibit pressure-sensitive adhesive property. It has been elucidated that the structure follows surface unevenness of an adherend to express its adhesive strength by virtue of a van der Waals force because the structure has a diameter of the order of from micrometers to nanometers.

A carbon nanotube as the fibrous columnar structure has been reported to exhibit pressure-sensitive adhesive property (see Patent Literature 2 and Patent Literature 3). It has been elucidated that the carbon nanotube follows the surface unevenness of the adherend to exhibit its pressure-sensitive adhesive strength by virtue of the van der Waals force because the carbon nanotube has a nanoscale diameter.

In recent years, there is a demand for means for allowing a particle having a specified particle diameter to be selectively acquired from a particle group with a large particle diameter distribution in some cases.

However, in a related-art viscoelastic body, it is difficult to selectively pick a particle having a specified particle diameter from a particle group with a large particle diameter distribution. In addition, the related-art viscoelastic body is difficult to handle because it easily adheres to a smooth surface owing to its strong tack.

CITATION LIST

Patent Literature

[PTL 1] JP 2009-173695 A
[PTL 2] US 2004/0071870 A1
[PTL 3] US 2006/0068195 A1

SUMMARY OF INVENTION

Technical Problem

It is an object of the present invention to provide a material for a viscoelastic body that has small tack, is excellent in handleability, and is capable of selectively picking a particle having a specified particle diameter. It is another object of the present invention to provide a viscoelastic body using such material.

Solution to Problem

According to one embodiment of the present invention, there is provided a carbon nanotube aggregate, including a plurality of carbon nanotubes, in which: the carbon nanotubes each have a plurality of walls; a distribution width of a wall number distribution of the carbon nanotubes is 10 walls or more, and a relative frequency of a mode of the wall number distribution is 25% or less; and a length of each of the carbon nanotubes is more than 10 µm.

In a preferred embodiment, the mode of the wall number distribution is present at a wall number of from 2 to 10.

In a preferred embodiment, the length of each of the carbon nanotubes is less than 300 µm.

According to another embodiment of the present invention, there is provided a carbon nanotube aggregate, including a plurality of carbon nanotubes, in which: the carbon nanotubes each have a plurality of walls; a mode of a wall number distribution of the carbon nanotubes is present at a wall number of 10 or less, and a relative frequency of the mode is 30% or more, and a length of each of the carbon nanotubes is more than 10 µm.

In a preferred embodiment, the mode of the wall number distribution is present at a wall number of 6 or less.

In a preferred embodiment, the length of each of the carbon nanotubes is less than 500 µm.

According to another embodiment of the present invention, there is provided a viscoelastic body. The viscoelastic body includes the carbon nanotube aggregate of the present invention.

In a preferred embodiment, the viscoelastic body of the present invention has a probe tack in a probe tack test of 200 gf or less at 25° C.

In a preferred embodiment, the viscoelastic body of the present invention selectively picks a particle having a particle diameter of less than 500 µm by adhesion.

In a preferred embodiment, the viscoelastic body of the present invention selectively picks a particle having a particle diameter of 200 µm or less by adsorption.

In a preferred embodiment, the viscoelastic body of the present invention further includes a base material, in which one end of each of the carbon nanotubes is fixed to the base material.

Advantageous Effects of Invention

According to one embodiment of the present invention, it is possible to provide the material for a viscoelastic body that has small tack, is excellent in handleability and is capable of selectively picking a particle having a specified particle diameter. It is also possible to provide the viscoelastic body using such material.

DESCRIPTION OF EMBODIMENTS

<<Carbon nanotube aggregate>>

Figure 1:
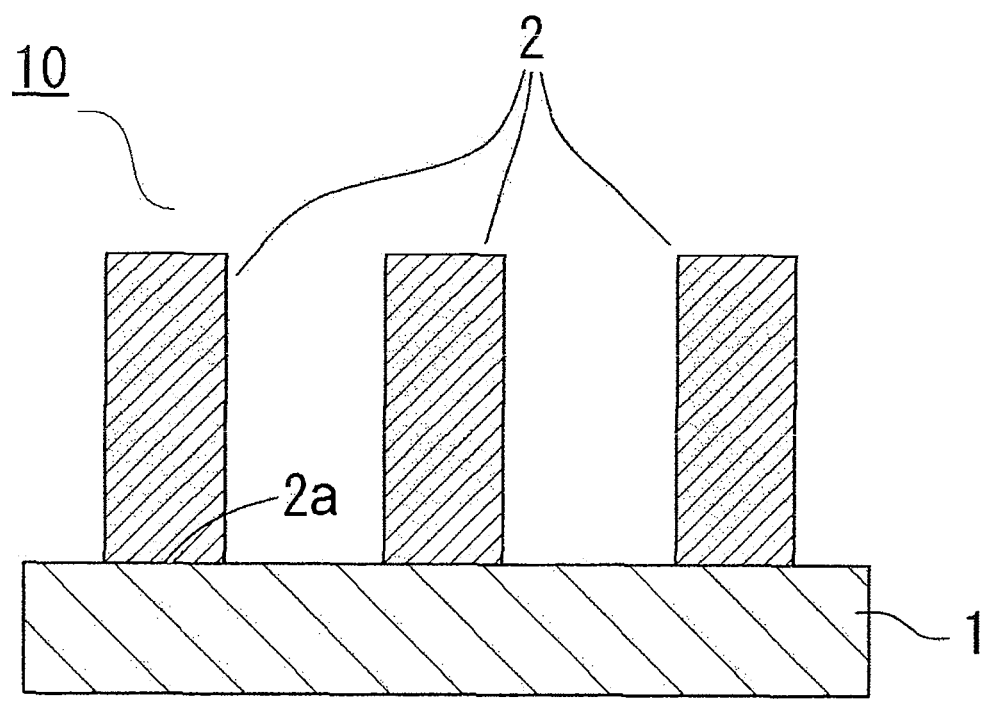
FIG. 1 is a schematic sectional view of a carbon nanotube aggregate in a preferred embodiment of the present invention.

FIG. 1 illustrates a schematic sectional view of a carbon nanotube aggregate in a preferred embodiment of the present invention (the view is not precisely illustrated to scale in order that each constituent portion may be clearly illustrated). A carbon nanotube aggregate 10 includes a base material 1 and carbon nanotubes 2. One end 2a of each of the carbon nanotubes 2 is fixed to the base material 1. The carbon nanotubes 2 are aligned in a lengthwise direction L. The carbon nanotubes 2 are preferably aligned in a direction substantially perpendicular to the base material 1. It should be noted that, even in the case where the carbon nanotube aggregate includes no base material unlike this illustrated example, the carbon nanotubes may exist together as an aggregate by virtue of a van der Waals force, and hence the carbon nanotube aggregate of the present invention may be an aggregate including no base material.

First Preferred Embodiment

A carbon nanotube aggregate according to a preferred embodiment (hereinafter sometimes referred to as "first preferred embodiment") of the present invention includes a plurality of carbon nanotubes, in which: the carbon nanotubes each have a plurality of walls; the distribution width of the wall number distribution of the carbon nanotubes is 10 walls or more; the relative frequency of the mode of the wall number distribution is 25% or less; and the length of each of the carbon nanotubes is more than 10 µm.

The distribution width of the wall number distribution of the carbon nanotubes is 10 walls or more, preferably from 10 walls to 30 walls, more preferably from 10 walls to 25 walls, still more preferably from 10 walls to 20 walls.

The "distribution width" of the wall number distribution of the carbon nanotubes refers to a difference between the maximum wall number and minimum wall number in the wall numbers of the carbon nanotubes. In the present invention, the distribution width of the wall number distribution of the carbon nanotubes falls within the above-mentioned range, and hence the carbon nanotubes can bring together excellent mechanical properties and a high specific surface area, and moreover, the carbon nanotubes can provide a carbon nanotube aggregate exhibiting excellent pressure-sensitive adhesive property.

In the present invention, the wall number and the wall number distribution of the carbon nanotubes may be measured with any appropriate device. The wall number and wall number distribution of the carbon nanotubes are preferably measured with a scanning electron microscope (SEM) or a transmission electron microscope (TEM). For example, at least 10, preferably 20 or more carbon nanotubes may be taken out from a carbon nanotube aggregate to evaluate the wall number and the wall number distribution by the measurement with the SEM or the TEM.

The maximum wall number of the carbon nanotubes is preferably from 5 to 30, more preferably from 10 to 30, still more preferably from 15 to 30, particularly preferably from 15 to 25.

The minimum wall number of the carbon nanotubes is preferably from 1 to 10, more preferably from 1 to 5.

In the present invention, the maximum wall number and minimum wall number of the carbon nanotubes fall within the above-mentioned ranges. Therefore, the carbon nanotubes can bring together additionally excellent mechanical properties and high specific surface area, and moreover, the carbon nanotubes can provide a carbon nanotube aggregate exhibiting additionally excellent pressure-sensitive adhesive property.

The relative frequency of the mode of the wall number distribution is 25% or less, preferably from 1% to 25%, more preferably from 5% to 25%, more preferably from 10% to 25%, particularly preferably from 15% to 25%. In the present invention, the relative frequency of the mode of the wall number distribution falls within the range. Therefore, the carbon nanotubes can bring together excellent mechanical properties and a high specific surface area, and moreover, the carbon nanotubes can provide a carbon nanotube aggregate exhibiting excellent pressure-sensitive adhesive property.

The mode of the wall number distribution is present at a wall number of preferably from 2 to 10, more preferably from 3 to 10. In the present invention, the mode of the wall number distribution falls within the range. Therefore, the carbon nanotubes can bring together excellent mechanical properties and a high specific surface area, and moreover, the carbon nanotubes can provide a carbon nanotube aggregate exhibiting excellent pressure-sensitive adhesive property.

Regarding the shape of each of the carbon nanotubes, the lateral section of the carbon nanotube has only to have any appropriate shape. The lateral section is of, for example, a substantially circular shape, an oval shape, or an n-gonal shape (n represents an integer of 3 or more).

The length of each of the carbon nanotubes is more than 10 µm, preferably 15 µm or more and less than 300 µm, more preferably 20 µm or more and less than 300 µm, still more preferably 30 µm or more and less than 300 µm, particularly preferably 40 µm or more and less than 300 µm, most preferably 50 µm or more and less than 300 µm. In the present invention, the length of each of the carbon nanotubes falls within the above-mentioned range, and hence the carbon nanotube aggregate of the present invention can be a material for a viscoelastic body capable of selectively picking a particle having a specified particle diameter.

The specific surface area and density of each of the carbon nanotubes may be set to any appropriate values.

Second Preferred Embodiment

A carbon nanotube aggregate according to another preferred embodiment (hereinafter sometimes referred to as "second preferred embodiment") of the present invention includes a plurality of carbon nanotubes, in which: the carbon nanotubes each have a plurality of walls; the mode of the wall number distribution of the carbon nanotubes is present at a wall number of 10 or less, the relative frequency of the mode of the wall number distribution is 30% or more; and the length of each of the carbon nanotubes is more than 10 µm and less than 500 µm.

The distribution width of the wall number distribution of the carbon nanotubes is preferably 9 walls or less, more preferably from 1 walls to 9 walls, still more preferably from 2 walls to 8 walls, particularly preferably from 3 walls to 8 walls.

The "distribution width" of the wall number distribution of the carbon nanotubes refers to a difference between the maximum wall number and minimum wall number of the wall numbers of the carbon nanotubes. In the present invention, the distribution width of the wall number distribution of the carbon nanotubes falls within the range. Therefore, the carbon nanotubes can bring together excellent mechanical properties and a high specific surface area, and moreover, the carbon nanotubes can provide a carbon nanotube aggregate exhibiting excellent pressure-sensitive adhesive property.

In the present invention, the wall number and wall number distribution of the carbon nanotubes may be measured with any appropriate device. The wall number and wall number distribution of the carbon nanotubes are preferably measured with a scanning electron microscope (SEM) or a transmission electron microscope (TEM). For example, at least 10, preferably 20 or more carbon nanotubes may be taken out from a carbon nanotube aggregate to evaluate the wall number and the wall number distribution by the measurement with the SEM or the TEM.

The maximum wall number of the carbon nanotubes is preferably from 1 to 20, more preferably from 2 to 15, still more preferably from 3 to 10.

The minimum wall number of the carbon nanotubes is preferably from 1 to 10, more preferably from 1 to 5.

In the present invention, the maximum wall number and minimum wall number of the carbon nanotubes fall within the above-mentioned ranges. Therefore, the carbon nanotubes can each bring together additionally excellent mechanical properties and a high specific surface area, and moreover, the carbon nanotubes can provide a carbon nanotube aggregate exhibiting additionally excellent pressure-sensitive adhesive property.

The relative frequency of the mode of the wall number distribution is 30% or more, preferably from 30% to 100%, more preferably from 30% to 90%, still more preferably from 30% to 80%, particularly preferably from 30% to 70%. In the present invention, the relative frequency of the mode of the wall number distribution falls within the above-mentioned range. Therefore, the carbon nanotubes can bring together excellent mechanical properties and a high specific surface area. Further, the carbon nanotubes can provide a carbon nanotube aggregate exhibiting excellent pressure-sensitive adhesive property.

The mode of the wall number distribution is present at a wall number of 10 or less, preferably from 1 to 10, more preferably from 2 to 8, still more preferably from 2 to 6. In the present invention, the mode of the wall number distribution falls within the range. Therefore, the carbon nanotubes can bring together excellent mechanical properties and a high specific surface area, and moreover, the carbon nanotubes can provide a carbon nanotube aggregate exhibiting excellent pressure-sensitive adhesive property.

Regarding the shape of each of the carbon nanotubes, the lateral section of the carbon nanotube has only to have any appropriate shape. The lateral section is of, for example, a substantially circular shape, an oval shape, or an n-gonal shape (n represents an integer of 3 or more).

The length of each of the carbon nanotubes is more than 10 μm, preferably 15 μm or more and less than 500 μm, more preferably 20 μm or more and less than 500 μm, still more preferably 30 μm or more and less than 500 μm, particularly preferably 40 μm or more and less than 500 μm, most preferably 50 μm or more and less than 500 μm. In the present invention, the length of each of the carbon nanotubes falls within the range. Therefore, the carbon nanotube aggregate of the present invention can be a material for a viscoelastic body capable of selectively picking a particle having a specified particle diameter.

The specific surface area and density of each of the carbon nanotubes may be set to any appropriate values.

<<Method of Producing Carbon Nanotube Aggregate>>

Any appropriate method may be adopted as a method of producing the carbon nanotube aggregate of the present invention.

The method of producing a carbon nanotube aggregate of the present invention is, for example, a method of producing a carbon nanotube aggregate aligned substantially perpendicularly from a smooth substrate by chemical vapor deposition (CVD) involving forming a catalyst layer on the substrate and filling a carbon source in a state in which a catalyst is activated with heat, plasma, or the like to grow the carbon nanotubes. In this case, the removal of the substrate provides a carbon nanotube aggregate aligned in a lengthwise direction.

Any appropriate substrate may be adopted as the substrate. The substrate is, for example, a material having smoothness and high-temperature heat resistance enough to resist the production of the carbon nanotubes. Examples of such material include quartz glass, silicon (such as a silicon wafer), and a metal plate made of, for example, aluminum. The substrate may be directly used as the substrate that may be included in the carbon nanotube aggregate of the present invention.

Figure 2:
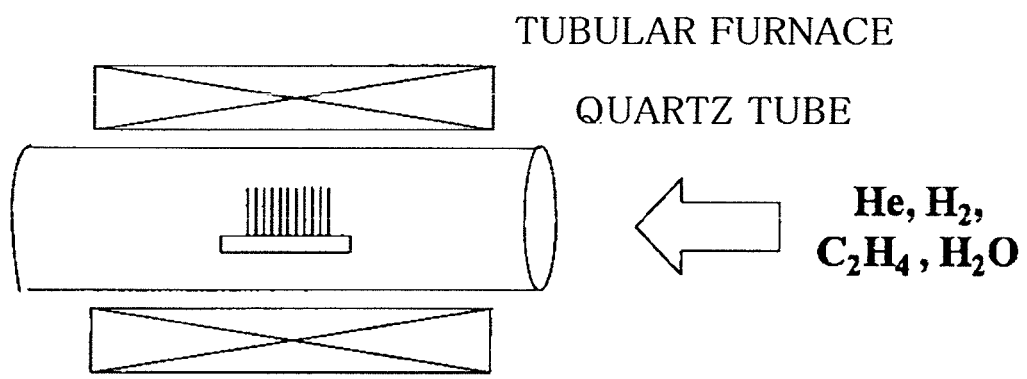
FIG. 2 is a schematic sectional view of an apparatus for producing a carbon nanotube aggregate in a preferred embodiment of the present invention.

Any appropriate apparatus may be adopted as an apparatus for producing the carbon nanotube aggregate of the present invention. The apparatus is, for example, a thermal CVD apparatus of a hot wall type formed by surrounding a cylindrical reaction vessel with a resistance heating electric tubular furnace as illustrated in FIG. 2. In this case, for example, a heat-resistant quartz tube is preferably used as the reaction vessel.

Any appropriate catalyst may be used as the catalyst (material for the catalyst layer) that may be used in the production of the carbon nanotube aggregate of the present invention. Examples of the catalyst include metal catalysts such as iron, cobalt, nickel, gold, platinum, silver, and copper.

Upon production of the carbon nanotube aggregate of the present invention, an alumina/hydrophilic film may be formed between the substrate and the catalyst layer as required.

Any appropriate method may be adopted as a method of producing the alumina/hydrophilic film. For example, the film may be obtained by producing an $SiO_2$ film on the substrate, depositing Al from the vapor, and increasing the temperature of Al to 450° C. after the deposition to oxidize Al. According to such production method, $Al_2O_3$ interacts with the hydrophilic $SiO_2$ film, and hence an $Al_2O_3$ surface different from that obtained by directly depositing $Al_2O_3$ from the vapor in particle diameter is formed. When Al is deposited from the vapor, and then its temperature is increased to 450° C. so that Al may be oxidized without the production of any hydrophilic film on the substrate, it may be difficult to form the $Al_2O_3$ surface having a different particle diameter. In addition, when the hydrophilic film is produced on the substrate and $Al_2O_3$ is directly deposited from the vapor, it may also be difficult to form the $Al_2O_3$ surface having a different particle diameter.

The catalyst layer that may be used in the production of the carbon nanotube aggregate of the present invention has a thickness of preferably from 0.01 to 20 nm, more preferably from 0.1 to 10 nm in order that fine particles may be formed. When the thickness of the catalyst layer that may be used in the production of the carbon nanotube aggregate of the present invention falls within the range, the carbon nanotube aggregate can bring together excellent mechanical properties and a high specific surface area, and moreover, the carbon nanotube aggregate can exhibit excellent pressure-sensitive adhesive property. Any appropriate method may be adopted as a method of forming the catalyst layer. Examples of the method include a method involving depositing a metal catalyst from the vapor, for example, with an electron beam (EB) or by sputtering and a method involving applying a suspension of metal catalyst fine particles onto the substrate.

Any appropriate carbon source may be used as the carbon source that may be used in the production of the carbon nanotube aggregate of the present invention. Examples of the carbon source include: hydrocarbons such as methane, ethylene, acetylene, and benzene; and alcohols such as methanol and ethanol.

Any appropriate temperature may be adopted as a production temperature in the production of the carbon nanotube aggregate of the present invention. For example, the temperature is preferably from 400° C. to 1,000° C., more preferably from 500° C. to 900° C., still more preferably from 600° C. to 800° C. in order that catalyst particles allowing sufficient expression of the effects of the present invention may be formed.

(Viscoelastic Body)

A viscoelastic body of the present invention includes the carbon nanotube aggregate of the present invention.

The viscoelastic body of the present invention may be formed of only the carbon nanotube aggregate of the present invention or may be formed of the carbon nanotube aggregate of the present invention and any appropriate member.

The viscoelastic body of the present invention may further include a base material, in which one end of each of the carbon nanotubes is fixed to the base material.

Examples of the base material include quartz glass, silicon (such as a silicon wafer), an engineering plastic, and a super engineering plastic. Specific examples of the engineering plastic and the super engineering plastic include polyimide, polyethylene, polyethylene terephthalate, acetylcellulose, polycarbonate, polypropylene, and polyamide. Any appropriate physical property may be adopted as each of various physical properties such as a molecular weight of such base material as long as the objects of the present invention can be achieved.

The thickness of the base material may be set to any appropriate value depending on purposes. In the case of, for example, a silicon substrate, the thickness is preferably from 100 μm to 10,000 μm, more preferably from 100 μm to 5,000 μm, still more preferably from 100 μm to 2,000 μm. In the case of, for example, a polypropylene substrate, the thickness is preferably from 1 μm to 1,000 μm, more preferably from 1 μm to 500 μm, still more preferably from 5 μm to 100 μm.

The surface of the base material may be subjected to conventional surface treatment, e.g., chemical or physical treatment such as chromic acid treatment, exposure to ozone, exposure to a flame, exposure to a high-voltage electric shock, or ionizing radiation treatment, or coating treatment with an under coat (such as the above-mentioned adherent material) in order that adhesiveness with an adjacent layer, retentivity, or the like may be improved.

The base material may be a single layer, or may be a multilayer body.

When the carbon nanotube aggregate of the present invention includes a base material, any appropriate method may be adopted as a method of fixing the carbon nanotubes to the base material. For example, a substrate used in the production of the carbon nanotube aggregate may be directly used as a base material. Further, a base material having formed thereon an adhesion layer may be fixed to the carbon nanotubes. Further, when the base material is a thermosetting resin, the fixing may be performed by producing a thin film in a state before a reaction, and crimping one end of the carbon nanotubes to the thin film layer, followed by curing treatment. In addition, when the base material is a thermoplastic resin or a metal, the fixing may be performed by crimping one end of the fibrous columnar structure to the base material in a molten state, followed by cooling to room temperature.

In the viscoelastic body of the present invention, the probe tack in a probe tack test is preferably 200 gf or less, more preferably from 10 gf to 200 gf, still more preferably from 20 gf to 195 gf, particularly preferably from 30 gf to 190 gf at 25° C. In the present invention, the probe tack falls within the range, and hence the viscoelastic body of the present invention is capable of selectively picking a particle having a specified particle diameter.

The viscoelastic body of the present invention can selectively pick a particle having a specified particle diameter. Herein, the term "particle diameter" in the present invention refers to a portion with the smallest diameter of a particle.

The viscoelastic body of the present invention can selectively pick particles each having a particle diameter of less than 500 μm by adhesion. The viscoelastic body of the present invention can selectively pick particles each having a particle diameter of preferably less than 400 μm, more preferably less than 360 μm by adhesion. Herein, the term "pick particles by adhesion" in the present invention refers to picking particles serving as an adherend by crimping the viscoelastic body of the present invention to the particles to cause the particles to adhere to the viscoelastic body. The degree of the crimping may be appropriately set depending on the purpose, and for example, there is given crimping by one reciprocation of a 5-kg roller.

The viscoelastic body of the present invention preferably does not substantially pick particles each having a particle diameter of 500 μm or more by adhesion but selectively picks particles each having a particle diameter of less than 500 μm by adhesion. The viscoelastic body of the present invention more preferably does not substantially pick particles each having a particle diameter of 400 μm or more by adhesion but selectively picks particles each having a particle diameter of less than 400 μm. The viscoelastic body of the present invention still more preferably does not substantially pick particles each having a particle diameter of 360 μm or more by adhesion but picks particles each having a particle diameter of less than 360 μm by adhesion. Herein, the phrase "not substantially pick particles by adhesion" in the present invention not only includes such a meaning that absolutely no particles are picked by adhesion but also includes such a meaning that almost no particles are picked by adhesion from the viewpoint of those skilled in the art. However, the phrase "not substantially pick particles by adhesion" in the present invention more preferably means that absolutely no particles are picked by adhesion.

The viscoelastic body of the present invention preferably does not substantially pick particles each having a particle diameter of X μm or more by adhesion but selectively picks particles each having a particle diameter of less than X μm by adhesion (it should be noted that X represents preferably 500, more preferably 400, still more preferably 360). Therefore, the viscoelastic body of the present invention is very useful in the case where it is desired to selectively pick only particles each having a particle diameter of less than X μm from a sample in which particles having various particle diameters are mixed.

The viscoelastic body of the present invention is preferably capable of selectively picking particles each having a particle diameter of 200 μm or less by adsorption. Herein, the term "pick particles by adsorption" in the present invention refers to picking particles serving as an adherend by causing the particles to adsorb to the viscoelastic body without crimping the viscoelastic body of the present invention to the particles. Specifically, for example, particles serving as an adherend are caused to adsorb to a viscoelastic body by bringing the particles into contact with the viscoelastic body at a small collision speed (for example, 1 m/s).

The viscoelastic body of the present invention preferably does not substantially pick particles each having a particle diameter of 250 μm or more by adsorption but selectively picks particles each having a particle diameter of 200 μm or less by adsorption. The viscoelastic body of the present invention more preferably does not substantially pick particles each having a particle diameter of 250 μm or more by adsorption but selectively picks particles each having a particle diameter of 180 μm or less by adsorption. The viscoelastic body of the present invention still more preferably does not substantially pick particles each having a particle diameter of 250 μm or more by adsorption but selectively picks particles each having a particle diameter of 150 μm or less by adsorption. Herein, the phrase "not substantially pick particles by adsorption" in the present invention not only includes such a meaning that absolutely no particles are picked by adsorption but also includes such a meaning that almost no particles are picked from the viewpoint of those skilled in the art by adsorption. However, the phrase "not substantially pick particles by adsorption" in the present invention more preferably means that absolutely no particles are picked by adsorption.

The viscoelastic body of the present invention preferably does not substantially pick particles each having a particle diameter of 250 μm or more by adsorption but selectively picks particles each having a particle diameter of X μm or less by adsorption (it should be noted that X represents preferably 200, more preferably 180, still more preferably 150). Therefore, the viscoelastic body of the present invention is very useful in the case where it is desired to selectively pick only particles each having a particle diameter of less than X μm from a sample in which particles having various particle diameters are mixed.

EXAMPLES

Hereinafter, the present invention is described by way of Examples. However, the present invention is not limited thereto. It should be noted that various evaluations and measurements were performed by the following methods.
<Evaluation of Wall Number and Wall Number Distribution of Carbon Nanotubes in Carbon Nanotube Aggregate>

The wall numbers and the wall number distribution of carbon nanotubes in the carbon nanotube aggregate of the present invention were measured with a scanning electron microscope (SEM) and/or a transmission electron microscope (TEM). At least 10, preferably 20 or more carbon nanotubes in the obtained carbon nanotube aggregate were observed with the SEM and/or the TEM to check the wall number of each carbon nanotube, and the wall number distribution was created.
<Evaluation of Picking of Particles by Crimping>

The following four kinds of glass-based abrasives (manufactured by Fuji Manufacturing Co., Ltd.) were respectively used as particles.
FGB-30 (particle diameter: 500 μm to 710 μm)
FGB-60 (particle diameter: 250 μm to 355 μm)
FGB-120 (particle diameter: 125 μm to 150 μm)
FGB-320 (particle diameter: 53 μm to 63 μm)
A viscoelastic body was placed on the particles and crimped thereto by one reciprocation of a 5-kg roller.

The surface of the viscoelastic body having picked particles by adhesion was observed with the SEM, and the number of the particles adhering to a region of 1 mm×1 mm was counted.
<Evaluation of Picking of Particles by Adsorption>

The following three kinds of glass-based abrasives (manufactured by Fuji Manufacturing Co., Ltd.) were respectively used as particles.
FGB-60 (particle diameter: 250 μm to 355 μm)
FGB-120 (particle diameter: 125 μm to 150 μm)
FGB-320 (particle diameter: 53 μm to 63 μm)
The particles were sprinkled over a viscoelastic body from a position of 50 mm above the viscoelastic body (collision speed=1 m/s) to cause the particles to adsorb to the surface of the viscoelastic body.

The surface of the viscoelastic body having picked particles by adsorption was observed with the SEM, and the number of the particles adhering to a region of 1 mm×1 mm was counted.
<Probe Tack Test>

A probe tack test was conducted under the following conditions to measure the maximum value of a pressure-sensitive adhesive strength.
Device: Tacking tester (manufactured by RESCA)
Probe: SUS 5 mmφ
Preload: 500 gf
Press Speed: 1 mm/min
Press Time: 5 s
Test Speed: 2.5 mm/min Example 1

An Al thin film (thickness: 10 nm) was formed on a silicon wafer (manufactured by Silicon Technology Co., Ltd.) serving as a substrate with a sputtering device (RFS-200 manufactured by ULVAC Inc.). An Fe thin film (thickness: 0.35 nm) was deposited from the vapor on the Al thin film with the sputtering device (RFS-200 manufactured by ULVAC Inc.).

After that, the substrate was placed in a quartz tube of 30 mmφ, and a helium/hydrogen (90/50 sccm) mixed gas whose moisture was kept at 600 ppm was caused to flow through the quartz tube for 30 minutes to replace the inside of the quartz tube. Then, the inside of the quartz tube was increased in temperature to 765° C. through use of an electric tubular furnace and stabilized at 765° C. While the temperature was kept at 765° C., the inside of the quartz tube was filled with a helium/hydrogen/ethylene (85/50/5 sccm, moisture content: 600 ppm) mixed gas. The quartz tube was left to stand for 1 minute to grow carbon nanotubes on the substrate. Thus, a carbon nanotube aggregate (1) in which the carbon nanotubes were aligned in a length direction was obtained.

The length of each of the carbon nanotubes in the carbon nanotube aggregate (1) was 30 μm.

In the wall number distribution of the carbon nanotubes in the carbon nanotube aggregate (1), the mode was present at a wall number of 1, and the relative frequency was 61%.

The obtained carbon nanotube aggregate (1) was used for the viscoelastic body (1) and subjected to various evaluations, and the results were summarized in Table 1 and Table 2.

Example 2

A carbon nanotube aggregate (2) in which carbon nanotubes were aligned in a length direction was obtained in the same way as in Example 1 except for setting the thickness of the Fe thin film to 1 nm.

The length of each of the carbon nanotubes in the carbon nanotube aggregate (2) was 30 μm.

In the wall number distribution of the carbon nanotubes in the carbon nanotube aggregate (2), the mode was present at a wall number of 2, and the relative frequency was 75%

The obtained carbon nanotube aggregate (2) was used for the viscoelastic body (2) and subjected to various evaluations, and the results were summarized in Table 1 and Table 2.

Example 3

A carbon nanotube aggregate (3) in which carbon nanotubes were aligned in a length direction was obtained in the same way as in Example 2 except for leaving the quartz tube to stand for 3 minutes after the quartz tube was filled with the helium/hydrogen/ethylene (85/50/5 sccm, moisture content: 600 ppm) mixed gas.

The length of each of the carbon nanotubes in the carbon nanotube aggregate (3) was 50 μm.

In the wall number distribution of the carbon nanotubes in the carbon nanotube aggregate (3), the mode was present at a wall number of 2, and the relative frequency was 75%.

The obtained carbon nanotube aggregate (3) was used for the viscoelastic body (3) and subjected to various evaluations, and the results were summarized in Table 1 and Table 2.

Example 4

A carbon nanotube aggregate (4) in which carbon nanotubes were aligned in a length direction was obtained in the same way as in Example 1 except for: setting the thickness of the Fe thin film to 2 nm; and leaving the quartz tube to stand for 5 minutes after the quartz tube was filled with the helium/hydrogen/ethylene (85/50/5 sccm, moisture content: 600 ppm) mixed gas.

The length of each of the carbon nanotubes in the carbon nanotube aggregate (4) was 70 μm.

In the wall number distribution of the carbon nanotubes in the carbon nanotube aggregate (4), the mode was present at a wall number of 7 or 8, and the relative frequency was 66%.

The obtained carbon nanotube aggregate (4) was used for the viscoelastic body (4) and subjected to various evaluations, and the results were summarized in Table 1 and Table 2.

Example 5

An Al thin film (thickness: 10 nm) was formed on a silicon substrate (wafer with a thermal oxide film, thickness: 1,000 μm, manufactured by K Surface Technology Co., Ltd.) with a vacuum deposition device (JEE-4X manufactured by JEOL Ltd.), and then subjected to oxidation treatment at 450° C. for 1 hour. Thus, an $Al_2O_3$ film was formed on the silicon substrate. An Fe thin film (thickness: 2 nm) was further deposited from the vapor on the $Al_2O_3$ film with the sputtering device (RFS-200 manufactured by ULVAC Inc.) to form a catalyst layer.

Next, the obtained silicon substrate with the catalyst layer was cut and placed in a quartz tube of 30 mm φ, and a helium/hydrogen (120/80 sccm) mixed gas whose moisture was kept at 350 ppm was caused to flow through the quartz tube for 30 minutes to replace the inside of the quartz tube. Then, the inside of the quartz tube was increased in temperature to 765° C. stepwise over 35 minutes through use of an electric tubular furnace and stabilized at 765° C. While the temperature was kept at 765° C., the inside of the quartz tube was filled with a helium/hydrogen/ethylene (105/80/15 sccm, moisture content: 350 ppm) mixed gas. The quartz tube was left to stand for 5 minutes to grow carbon nanotubes on the substrate. Thus, a carbon nanotube aggregate (5) in which the carbon nanotubes were aligned in a length direction was obtained.

The length of each of the carbon nanotubes in the carbon nanotube aggregate (5) was 90 μm.

In the wall number distribution of the carbon nanotubes in the carbon nanotube aggregate (5), the distribution width of the wall number distribution was 17 walls (4 walls to 20 walls), the mode was present at wall numbers of 4 and 8, and the relative frequency was 20% for each.

The obtained carbon nanotube aggregate (5) was used for the viscoelastic body (5) and subjected to various evaluations, and the results were summarized in Table 1 and Table 2.

Example 6

A carbon nanotube aggregate (6) in which carbon nanotubes were aligned in a length direction was obtained in the same way as in Example 1 except for: using acetylene in place of ethylene; and leaving the quartz tube to stand for 7 minutes after the quartz tube was filled with the helium/hydrogen/acetylene (85/50/5 sccm, moisture content: 600 ppm) mixed gas.

The length of each of the carbon nanotubes in the carbon nanotube aggregate (6) was 100 μm.

In the wall number distribution of the carbon nanotubes in the carbon nanotube aggregate (6), the mode was present at a wall number of 7 or 8, and the relative frequency was 66%.

The obtained carbon nanotube aggregate (6) was used for the viscoelastic body (6) and subjected to various evaluations, and the results were summarized in Table 1 and Table 2.

Example 7

A carbon nanotube aggregate (7) in which carbon nanotubes were aligned in a length direction was obtained in the same way as in Example 2 except for leaving the quartz tube to stand for 10 minutes after the quartz tube was filled with the helium/hydrogen/ethylene (85/50/5 sccm, moisture content: 600 ppm) mixed gas.

The length of each of the carbon nanotubes in the carbon nanotube aggregate (7) was 200 μm.

In the wall number distribution of the carbon nanotubes in the carbon nanotube aggregate (7), the mode was present at a wall number of 2, and the relative frequency was 75%.

The obtained carbon nanotube aggregate (7) was used for the viscoelastic body (7) and subjected to various evaluations, and the results were summarized in Table 1 and Table 2.

Example 8

A carbon nanotube aggregate (8) in which carbon nanotubes were aligned in a length direction was obtained in the same way as in Example 5 except for leaving the quartz tube to stand for 10 minutes after the quartz tube was filled with the helium/hydrogen/ethylene (105/80/15 sccm, moisture content: 350 ppm) mixed gas.

The length of each of the carbon nanotubes in the carbon nanotube aggregate (8) was 250 μm.

In the wall number distribution of the carbon nanotubes in the carbon nanotube aggregate (8), the distribution width of the wall number distribution was 17 walls (4 walls to 20 walls), the mode was present at wall numbers of 4 and 8, and the relative frequency was 20% for each.

The obtained carbon nanotube aggregate (8) was used for the viscoelastic body (8) and subjected to various evaluations, and the results were summarized in Table 1 and Table 2.

Example 9

A carbon nanotube aggregate (9) in which carbon nanotubes were aligned in a length direction was obtained in the same way as in Example 1 except for leaving the quartz tube to stand for 20 minutes after the quartz tube was filled with the helium/hydrogen/ethylene (85/50/5 sccm, moisture content: 600 ppm) mixed gas:

The length of each of the carbon nanotubes in the carbon nanotube aggregate (9) was 400 μm.

In the wall number distribution of the carbon nanotubes in the carbon nanotube aggregate (9), the mode was present at a wall number of 1, and the relative frequency was 61%.

The obtained carbon nanotube aggregate (9) was used for the viscoelastic body (9) and subjected to various evaluations, and the results were summarized in Table 1 and Table 2.

Example 10

A carbon nanotube aggregate (10) in which carbon nanotubes were aligned in a length direction was obtained in the same way as in Example 5 except for leaving the quartz tube to stand for minutes after the quartz tube was filled with the helium/hydrogen/ethylene (105/80/15 sccm, moisture content: 350 ppm) mixed gas.

The length of each of the carbon nanotubes in the carbon nanotube aggregate (10) was 400 μm.

In the wall number distribution of the carbon nanotubes in the carbon nanotube aggregate (10), the distribution width of the wall number distribution was 17 walls (4 walls to 20 walls), the mode was present at wall numbers of 4 and 8, and the relative frequency was 20% for each.

The obtained carbon nanotube aggregate (10) was used for the viscoelastic body (10) and subjected to various evaluations, and the results were summarized in Table 1 and Table 2.

Example 11

A carbon nanotube aggregate (11) in which carbon nanotubes were aligned in a length direction was obtained in the same way as in Example 2 except for leaving the quartz tube to stand for minutes after the quartz tube was filled with the helium/hydrogen/ethylene (85/50/5 sccm, moisture content: 600 ppm) mixed gas.

The length of each of the carbon nanotubes in the carbon nanotube aggregate (11) was 500 μm.

In the wall number distribution of the carbon nanotubes of the carbon nanotube aggregate (11), the mode was present at a wall number of 2, and the relative frequency was 75%.

The obtained carbon nanotube aggregate (11) was used for the viscoelastic body (11) and subjected to various evaluations, and the results were summarized in Table 1 and Table 2.

Example 12

A carbon nanotube aggregate (12) in which carbon nanotubes were aligned in a length direction was obtained in the same way as in Example 4 except for leaving the quartz tube to stand for minutes after the quartz tube was filled with the helium/hydrogen/ethylene (85/50/5 sccm, moisture content: 600 ppm) mixed gas.

The length of each of the carbon nanotubes in the carbon nanotube aggregate (12) was 800 μm.

In the wall number distribution in the carbon nanotubes in the carbon nanotube aggregate (12), the mode was present at a wall number of 3, and the relative frequency was 72%.

The obtained carbon nanotube aggregate (12) was used for the viscoelastic body (12) and subjected to various evaluations, and the results were summarized in Table 1 and Table 2.

Example 13

A carbon nanotube aggregate (13) in which carbon nanotubes were aligned in a length direction was obtained in the same way as in Example 2 except for leaving the quartz tube to stand for minutes after the quartz tube was filled with the helium/hydrogen/ethylene (85/50/5 sccm, moisture content: 600 ppm) mixed gas.

The length of each of the carbon nanotubes in the carbon nanotube aggregate (13) was 1,200 μm.

In the wall number distribution of the carbon nanotubes in the carbon nanotube aggregate (13), the mode was present at a wall number of 2, and the relative frequency was 75%.

The obtained carbon nanotube aggregate (13) was used for the viscoelastic body (13) and subjected to various evaluations, and the results were summarized in Table 1 and Table 2.

Comparative Example 1

A carbon nanotube aggregate (C1) in which carbon nanotubes were aligned in a length direction was obtained in the same way as in Example 1 except for leaving the quartz tube to stand for seconds after the quartz tube was filled with the helium/hydrogen/ethylene (85/50/5 sccm, moisture content: 600 ppm) mixed gas.

The length of each of the carbon nanotubes in the carbon nanotube aggregate (C1) was 10 μm.

In the wall number distribution of the carbon nanotubes in the carbon nanotube aggregate (C1), the mode was present at a wall number of 1, and the relative frequency was 61%.

The obtained carbon nanotube aggregate (C1) was used for the viscoelastic body (C1) and subjected to various evaluations, and the results were summarized in Table 1 and Table 2.

Comparative Example 2

A carbon nanotube aggregate (C2) in which carbon nanotubes were aligned in a length direction was obtained in the same way as in Example 2 except for leaving the quartz tube to stand for seconds after the quartz tube was filled with the helium/hydrogen/ethylene (85/50/5 sccm, moisture content: 600 ppm) mixed gas.

The length of each of the carbon nanotubes in the carbon nanotube aggregate (C2) was 10 μm.

In the wall number distribution of the carbon nanotubes in the carbon nanotube aggregate (C2), the mode was present at a wall number of 2, and the relative frequency was 75%.

The obtained carbon nanotube aggregate (C2) was used for the viscoelastic body (C2) and subjected to various evaluations, and the results were summarized in Table 1 and Table 2.

Comparative Example 3

A double-coated pressure-sensitive adhesive tape (No. 5000N manufactured by Nitto Denko Corporation) was used as a viscoelastic body (C3) and subjected to various evaluations, and the results were summarized in Table 1 and Table 2.

Comparative Example 4

A 3M double-coated tape (4390 manufactured by Sumitomo 3M Limited) was used as a viscoelastic body (C4) and subjected to various evaluations, and the results were summarized in Table 1 and Table 2.

TABLE 1

| | Length of carbon nanotube (μm) | Probe tack (gf) | Evaluation of picking of particles by crimping (pieces/mm²) | | | |
|---|---|---|---|---|---|---|
| | | | FGB-320 53 μm to 63 μm | FGB-120 125 μm to 150 μm | FGB-60 250 μm to 355 μm | FGB-30 500 μm to 710 μm |
| Example 1 | 30 | 39.6 | 21 | 3 | 0 | 0 |
| Example 2 | 30 | 42.1 | 29 | 1 | 0 | 0 |
| Example 3 | 50 | 62.8 | 206 | 9 | 6 | 0 |
| Example 4 | 70 | 74.1 | 177 | 7 | 5 | 0 |
| Example 5 | 90 | 95.5 | 184 | 12 | 4 | 0 |
| Example 6 | 100 | 127.2 | 199 | 13 | 8 | 0 |
| Example 7 | 200 | 144.0 | 283 | 9 | 7 | 0 |
| Example 8 | 250 | 182.1 | 302 | 14 | 5 | 0 |
| Example 9 | 400 | 189.7 | 349 | 13 | 10 | 0 |
| Example 10 | 400 | 254.3 | 350 | 13 | 8 | 0 |
| Example 11 | 500 | 213.6 | 331 | 15 | 11 | 0 |
| Example 12 | 800 | 225.7 | 422 | 11 | 9 | 0 |
| Example 13 | 1,200 | 211.9 | 408 | 12 | 10 | 0 |
| Comparative Example 1 | 10 | 5.1 | 0 | 0 | 0 | 0 |
| Comparative Example 2 | 10 | 3.8 | 0 | 0 | 0 | 0 |
| Comparative Example 3 | 160 | 587.5 | 398 | 21 | 12 | 2 |
| Comparative Example 4 | 40/50 | 670.2 | 416 | 27 | 9 | 2 |

TABLE 2

| | Length of carbon nanotube (μm) | Probe tack (gf) | Evaluation of picking of particles by adsorption (pieces/mm²) | | |
|---|---|---|---|---|---|
| | | | FGB-320 53 μm to 63 μm | FGB-120 125 μm to 150 μm | FGB-60 250 μm to 355 μm |
| Example 1 | 30 | 39.6 | 21 | 0 | 0 |
| Example 2 | 30 | 42.1 | 29 | 0 | 0 |
| Example 3 | 50 | 62.8 | 135 | 6 | 0 |
| Example 4 | 70 | 74.1 | 114 | 4 | 0 |
| Example 5 | 90 | 95.5 | 162 | 13 | 0 |
| Example 6 | 100 | 127.2 | 145 | 10 | 0 |
| Example 7 | 200 | 144.0 | 203 | 7 | 0 |
| Example 8 | 250 | 182.1 | 237 | 11 | 0 |
| Example 9 | 400 | 189.7 | 289 | 12 | 0 |
| Example 10 | 400 | 254.3 | 306 | 8 | 0 |
| Example 11 | 500 | 213.6 | 257 | 12 | 0 |
| Example 12 | 800 | 225.7 | 390 | 9 | 0 |
| Example 13 | 1,200 | 211.9 | 412 | 10 | 0 |
| Comparative Example 1 | 10 | 5.1 | 0 | 0 | 0 |
| Comparative Example 2 | 10 | 3.8 | 0 | 0 | 0 |
| Comparative Example 3 | 160 | 587.5 | 398 | 21 | 12 |
| Comparative Example 4 | 40/50 | 670.2 | 416 | 27 | 9 |

INDUSTRIAL APPLICABILITY

The carbon nanotube aggregate of the present invention can be suitably used for a viscoelastic body that has small tack, is excellent in handleability, and is capable of selectively acquiring a particle having a specified particle diameter from a particle group having a large particle diameter distribution.

REFERENCE SIGNS LIST 10 carbon nanotube aggregate
1 base material
2 carbon nanotube
2a one end of carbon nanotube

The invention claimed is:

1. A viscoelastic body, comprising:
a carbon nanotube aggregate, comprising a plurality of carbon nanotubes, wherein:
the carbon nanotubes each have a plurality of walls;
a distribution width of a wall number distribution of the carbon nanotubes is 10 walls or more, and a relative frequency of a mode of the wall number distribution is 25% or less; and
a length of each of the carbon nanotubes is more than 10 μm,
wherein the viscoelastic body has a probe tack in a probe tack test of 200 gf or less at 25° C.

2. A viscoelastic body according to claim 1, wherein the viscoelastic body selectively picks a particle having a particle diameter of less than 500 μm by adhesion.

3. A viscoelastic body according to claim 1, wherein the viscoelastic body selectively picks a particle having a particle diameter of 200 μm or less by adsorption.

4. A viscoelastic body according to claim 1, further comprising a base material, wherein one end of each of the carbon nanotubes is fixed to the base material.

5. A viscoelastic body, comprising:
a carbon nanotube aggregate, comprising a plurality of carbon nanotubes, wherein:
the carbon nanotubes each have a plurality of walls;
a mode of a wall number distribution of the carbon nanotubes is present at a wall number of 10 or less, and a relative frequency of the mode is 30% or more; and a length of each of the carbon nanotubes is more than 10 µm,
wherein the viscoelastic body has a probe tack in a probe tack test of 200 gf or less at 25° C.

6. A viscoelastic body according to claim 5, wherein the viscoelastic body selectively picks a particle having a particle diameter of less than 500 µm by adhesion.

7. A viscoelastic body according to claim 5, wherein the viscoelastic body selectively picks a particle having a particle diameter of 200 µm or less by adsorption.

8. A viscoelastic body according to any one of claim 5, further comprising a base material, wherein one end of each of the carbon nanotubes is fixed to the base material.

* * * * *